United States Patent [19]

Sudyk

[11] 4,161,379
[45] Jul. 17, 1979

[54] APPARATUS FOR PRODUCING REINFORCED HOSE

[75] Inventor: John R. Sudyk, Middlefield, Ohio

[73] Assignee: The Johnson Rubber Company, Middlefield, Ohio

[21] Appl. No.: 817,584

[22] Filed: Jul. 21, 1977

[51] Int. Cl.² ............................................. B29D 23/05
[52] U.S. Cl. .................................... 425/112; 425/113; 425/133.1; 425/192 R; 425/462; 425/467
[58] Field of Search ................ 425/113, 114, 112, 380, 425/381, 466, 467, 190, 192 R, 133.1, 133.5; 264/173, 174

[56] References Cited

U.S. PATENT DOCUMENTS

| | | | |
|---|---|---|---|
| 3,351,695 | 11/1967 | Hollingsworth | 425/113 X |
| 3,697,209 | 10/1972 | Schiesser | 425/133.1 X |
| 4,081,232 | 3/1978 | Pemberton et al. | 425/133.1 X |

Primary Examiner—Roy Lake
Assistant Examiner—Mark Rosenbaum
Attorney, Agent, or Firm—McNenny, Pearne, Gordon, Gail, Dickinson & Schiller

[57] ABSTRACT

A reinforced hose is disclosed having an overlapping spiral tube of reinforcing fabric embedded between inner and outer layers of extruded material in which the fabric is fully extended and tensioned during the manufacturing process and a good bond is obtained between the layers through the openings in the fabric. Also disclosed is a dual feed extrusion head for manufacturing such hose in which an outer nozzle assembly includes two annular plates bolted together and separable for easy cleaning. Such outer nozzle assembly is adjustably mounted on the forward end of the extruder head frame. A tubular inner nozzle assembly is provided with a nozzle at the exit end thereof located within the outer nozzle assembly and spaced therefrom. A fabric guide is positioned around the inner nozzle assembly and establishes the spiral configuration of the reinforcing fabric which in turn feeds in between the inner and outer nozzles. The inner nozzle is axially adjustable with respect to the outer nozzle. The extrusion head is constructed so that substantial access in clearance is provided around the inner nozzle assembly to provide an open feed path for the fabric as it approaches the fabric guide. A central pin which is axially adjustable within the inner nozzle assembly constitutes part of the nozzle and also provides means to expand the inner layer to extend the fabric and insure good bonding contact between the two layers of the hose.

21 Claims, 9 Drawing Figures

APPARATUS FOR PRODUCING REINFORCED HOSE

BACKGROUND OF THE INVENTION

This invention relates generally to reinforced hose and more particularly to a novel and improved reinforced hose, to a novel and improved method for manufacturing such hose, and to a novel and improved extrusion head for producing such hose.

PRIOR ART

Generally in the past reinforced hose such as reinforced rubber hose has been formed by a three step process in which an inner cylindrical tube portion is extruded, a reinforcing layer is applied to the inner tube portion by braiding machines, and subsequently, an outer tube is extruded over the braid. Such procedure requires large capital investment in manufacturing equipment, provides a production rate which is limited by the rate at which the braid can be produced, and often results in the hose having a poor bond between the two layers of hose material.

More recently, a system has been developed in which a strip or strips of reinforcing fabric is fed into a dual extrusion head which functions to sequentially or simultaneously extrude the two tubular layers with the reinforcing material positioned at the interface therebetween. Such devices are described in the U.S. Pat. to Schiesser Nos. 3,697,209 and 3,856,447.

SUMMARY OF THE INVENTION

The present invention provides a novel and improved dual feed extrusion head operable to produce an improved reinforced hose. In such head a strip of fabric is fed as a spiral tube into a zone around the inner extrusion nozzle which produces the inner tube portion and within the outer extrusion nozzle which produces the outer tube portion. The preferred head is constructed so that at least a substantial portion of the fabric path is visible and accessible.

The nozzle is constructed for full adjustment with most of the adjustments being operable even while the head is in use. The structure is also arranged for easy assembly and disassembly permitting easy cleaning of the head after its use. Further, the structure is relatively simple to produce at relatively low cost.

The head is provided with a central pin with an enlarged portion which expands the inner layer of hose material flowing from the inner orifice as it progresses along the head. This causes the inner tube portion to expand against the reinforcing material and insures that the strands of the fabric are fully extended. Further, it insures that the hose material flows through the fabric and establishes a superior bond between the two layers of material without the use of adhesives. Since the hose produced by the head includes an improved bond between the two layers of material and incorporates fully extended and tensioned fabric an improved hose product is provided.

DETAILED DESCRIPTION OF THE DRAWING

Figure 1:
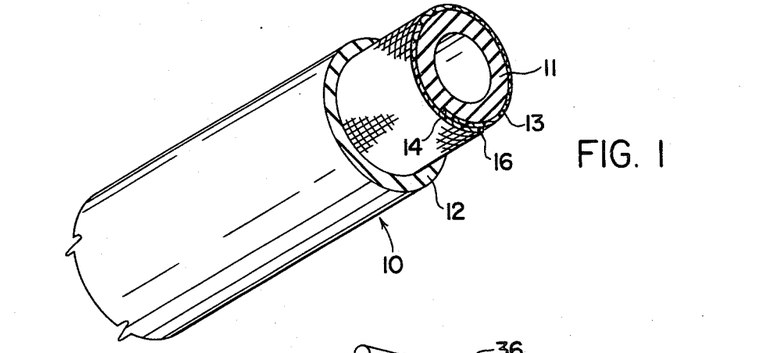
FIG. 1 is a perspective view of a short section of reinforced hose in accordance with the present invention.

FIG. 1 illustrates a short piece of reinforced hose 10 in accordance with the present invention. Such hose may be formed of extrudable plastic, rubber or other elastomeric materials and includes an inner tube portion 11 and an outer tube portion 12 with a fabric reinforcement material 13 along the interface between the two tube portions 11 and 12. Such fabric material may be of any suitable knitted or woven type which can be manufactured in a long strip with a substantially open weave to allow the material forming the inner and outer tubes to bond through the openings in the fabric. In FIG. 1 the thickness of the fabric is exaggerated for purposes of illustration.

The strip of fabric 13 is formed in a spiral overlapping tube or cylinder in a manner described in more detail below and it is provided with an overlapping section extending from 14 to 16. As mentioned previously the fabric should have an open weave so that the material forming the two portions 11 and 12 can flow through the openings in the fabric to form a bond. Preferably the fabric is sufficiently open so that the material flows through and bonds even in the overlapping zone between 14 and 16.

In accordance with the present invention the material forming inner tube portion 11 is extruded through an inner annular nozzle with an inside diameter significantly smaller than the final diameter produced in the finished hose. Such material is expanded during the manufacture to cause the fabric to be extended fully and to insure that the material forming the inner tube portion 11 flows into the openings in the fabric into tight bonding engagement with a material forming the outer tube portion 12.

Because the fabric is fully extended during the manufacture of the hose, the finished hose contains a fabric which is tensioned and is free of wrinkles or the like which could otherwise allow expansion of the hose when pressurized before the fabric reinforcing material is tensioned to resist further expansion.

Figure 2:
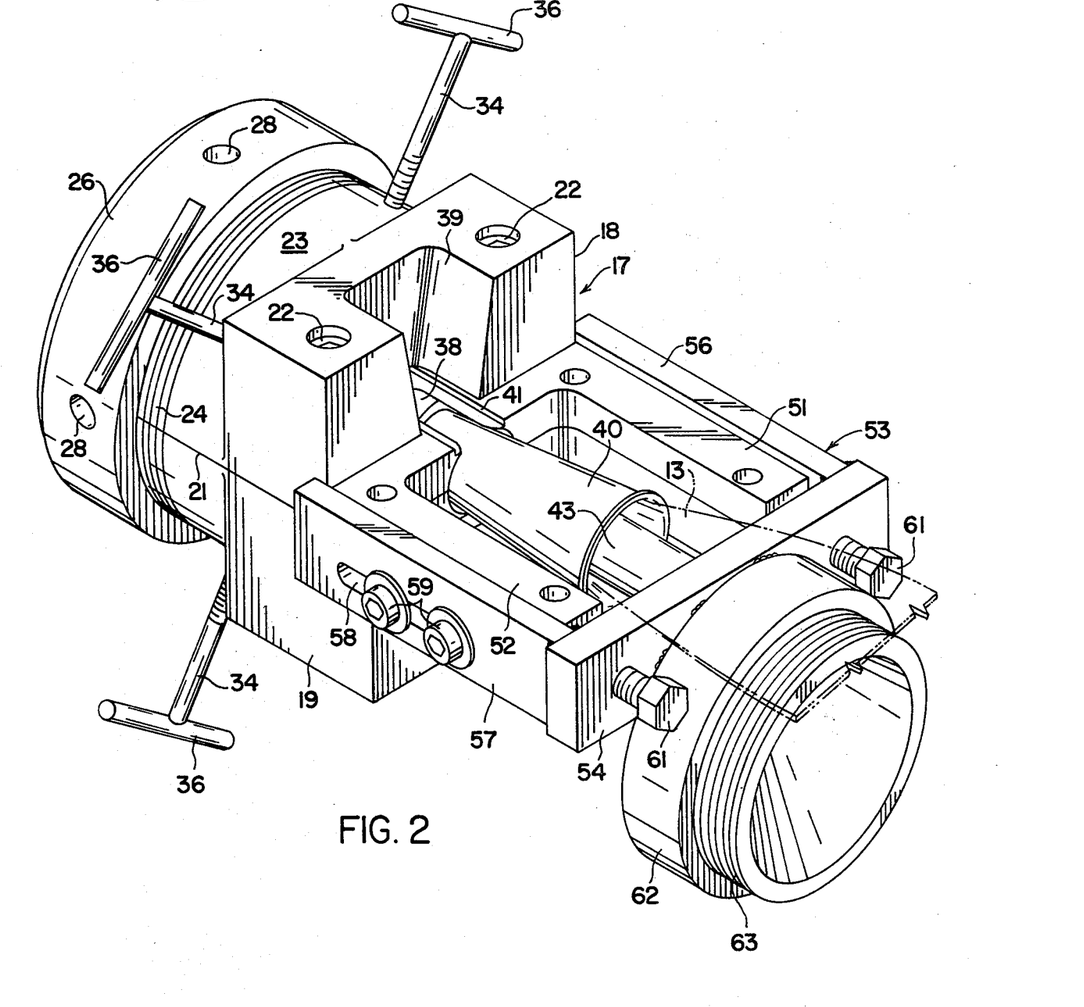
FIG. 2 is a perspective view of an extrusion head for producing hose as illustrated in FIG. 1 and incorporating this invention.
Figure 3:
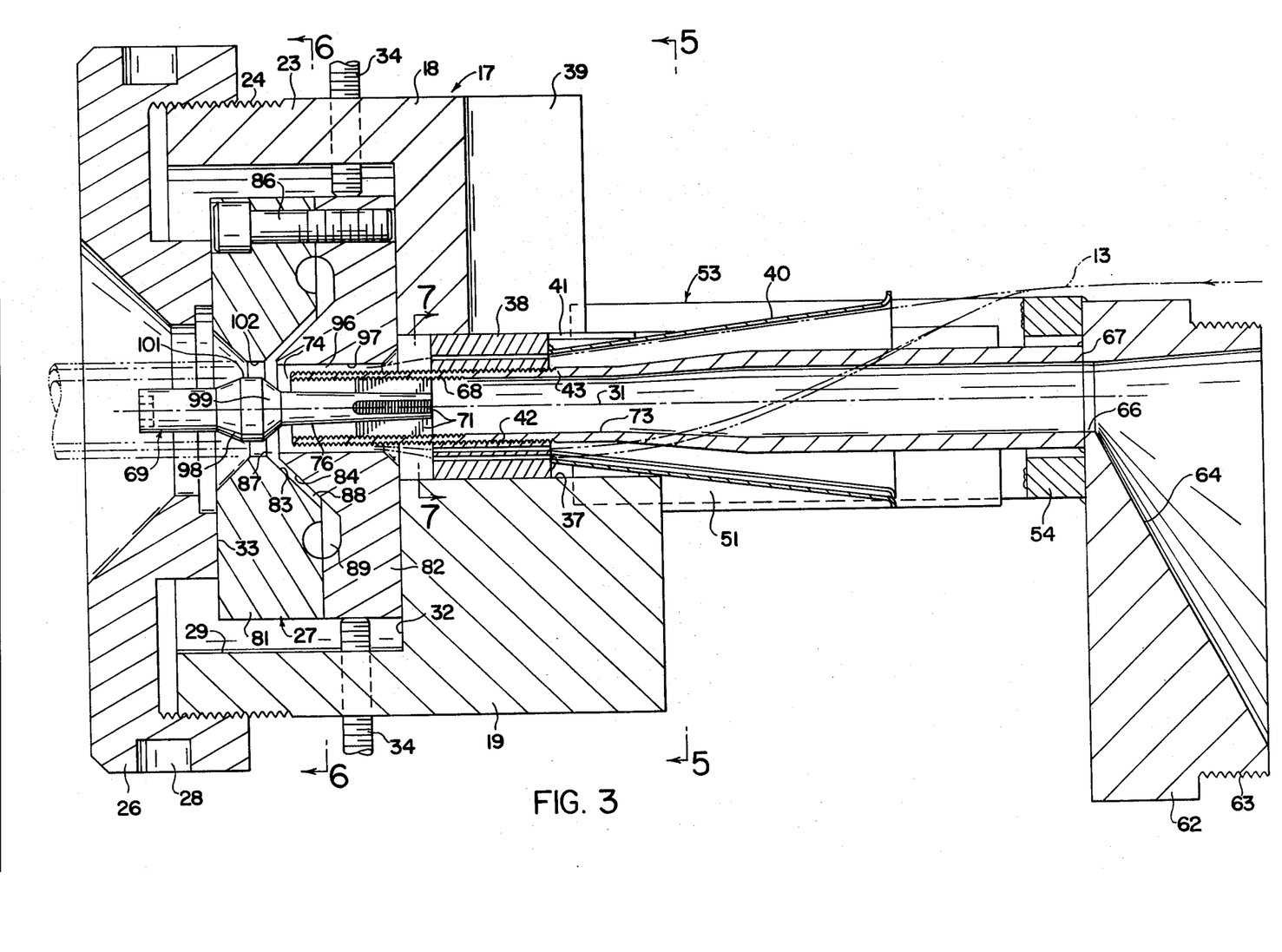
FIG. 3 is a side elevation generally in longitudinal section of the extrusion head illustrated in FIG. 2.
Figure 4:
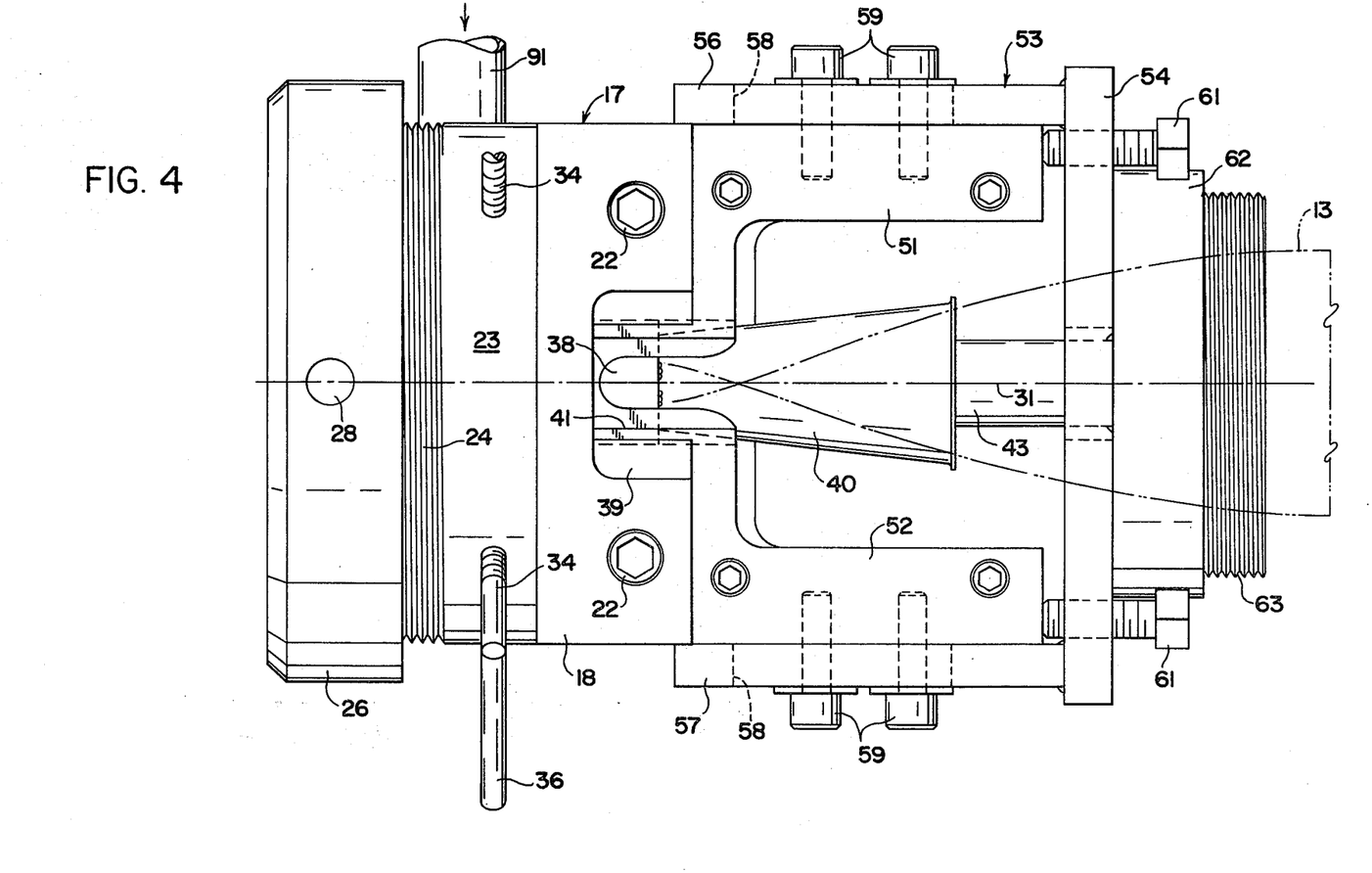
FIG. 4 is a plan view of the extrusion head illustrated in FIGS. 2 and 3.

The hose of FIG. 1 is preferably formed by an extrusion head of the types illustrated in the remainder of the drawings. Referring to FIGS. 2 through 4 such extrusion head is provided with a body or frame assembly 17 consisting of two body members 18 and 19 which abut along an interface 21 and are bolted together by bolt fasteners 22. In use the two body members are maintained in the assembled position illustrated and are formed into separable parts primarily to allow easy disassembly of the unit for cleaning or the like and for ease of manufacture. The body assembly 17 includes a forward cylindrical portion 23 which is externally threaded at 24 to receive a face ring 26 which is threaded onto the cylindrical portion 23 for mounting an outer nozzle assembly 27 and is removable to allow removal of such assembly. Wrenching openings 28 are formed in the ring 26 to facilitate its installation and removal.

Extending back from the forward end of the body assembly 17 is a cylindrical opening 29 which is co-axial with the center axis 31 of the extrusion head and extends to a radial wall 32. Such cylindrical opening 29 is sized to receive the outer nozzle assembly 27 with substantial clearance when such nozzle assembly is installed (as best illustrated in FIG. 3) against the radial face 32. The face ring is provided with a radial face 33 which engages the forward face of the outer nozzle assembly to clamp it against the radial face 32 of the body assembly when the nozzle is installed. The nozzle assembly, however, can be removed by merely removing the face ring 26 for ease of cleaning and disassembly.

The nozzle assembly 27 is radially adjusted within the openings 29 by four peripherally spaced adjustment screw members 34 which are threaded through the cylindrical portion 23 and engage the outer surface of the outer nozzle 27 to radially position the nozzle within the cylindrical opening 29. Preferably each of the adjusting screws 34 is provided with a handle portion 36 for ease of adjustment. The adjustment screws are located at 90° spacing around the axis 31 and are positioned along opposite diagonals. In FIG. 3, two of the screws are shown as displaced to the vertical plane of the extrusion head for purposes of illustration but it should be understood that the adjustment screws are preferably located along the diagonals as illustrated in the remainder of the drawings.

Figure 5:
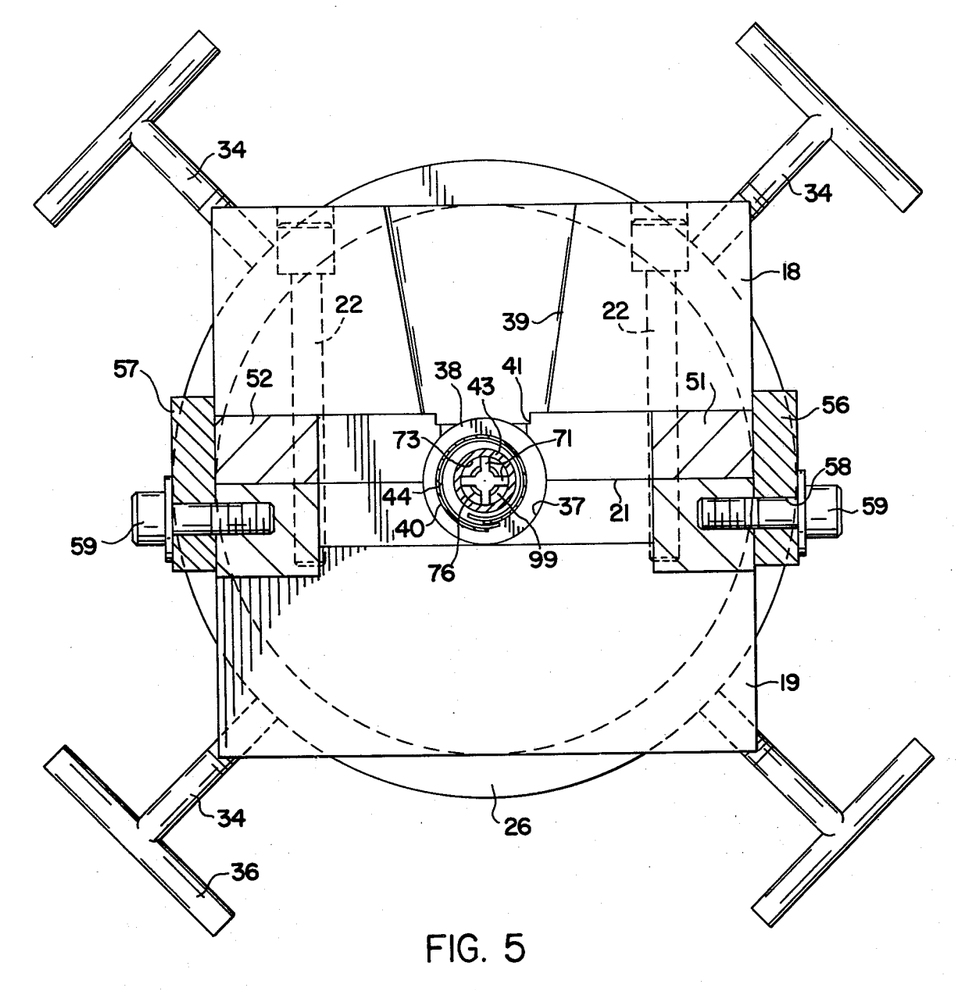
FIG. 5 is a cross section taken generally along 5—5 of FIG. 3 illustrating the guide ring used for guiding the fabric into the extrusion head.
Figure 6:
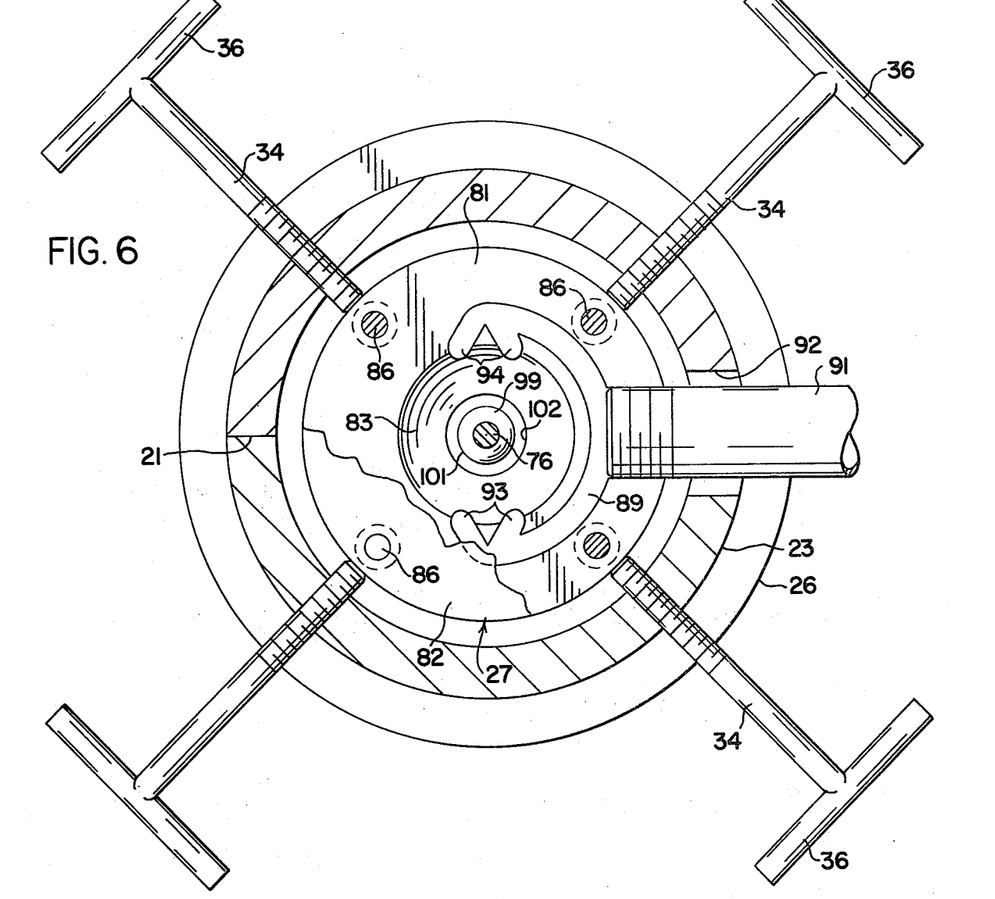
FIG. 6 is a cross section taken generally along 6—6 of FIG. 3 illustrating the flow passages through which the material flows to the outer extrusion nozzle.

Extending back from the radial face 32 within the body assembly is a central bore 37 proportioned to receive a fabric guide 38 with a close fit. The housing member 18 is formed with a vertically extending cut-out or recess 39 which extends to a step section at 41 (as best illustrated in FIG. 5) which in turn is open to the central bore 37 so that the position of the fabric guide 38 along the bore 37 can be visually determined at any time.

Figure 7:
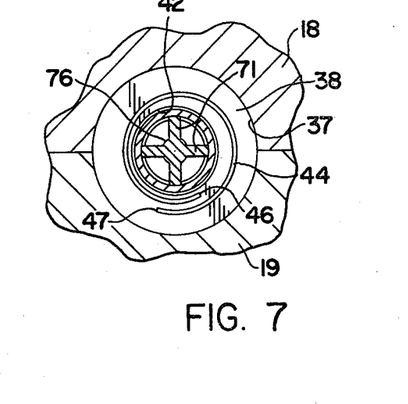
FIG. 7 is a fragmentary cross section taken generally along 7—7 of FIG. 13.

The fabric guide 38 is formed with a threaded central passage 42 through which an inner tube 43 is threaded as best illustrated in FIG. 3. A spiral shaped groove 44 is cut through the fabric guide as best illustrated in FIG. 7 and provides a first end 46 substantially adjacent to the bore 42 and an opposite end at 47 which is radially spaced outwardly from the adjacent portion of the groove extending from the end 46. The two ends of the groove overlap so that when a strip of fabric reinforcing material passes through the groove 44 it assumes a spiral overlapping tube shape. When desired a sheet metal generally conical guide 40 is mounted on the entrance end of the guide 38 to assist the forming and feeding of the fabric into the groove 44.

The body assembly is provided with a pair of axially extending spaced and parallel support projections 51 and 52 which extend along opposite sides of the central axis 31 as best illustrated in FIGS. 2 and 4 to receive and support a U-shaped weldment 53 consisting of a cross plate 54 and parallel legs 56 and 57 which extend along opposite sides of the mounting projections 51 and 52 respectively and constitute the frame extension. Each of the legs 56 and 57 are provided with axially extending slots 58 to receive a pair of clamping screws 59 to lock the weldment 53 in its adjusted position with respect to the body assembly 17. A pair of jack screws 61 are threaded through the cross plate 54 and bear at their ends against the ends of the supports 51 and 52. Axial adjustment of the weldment can therefore be accomplished by loosening the screws 59 and adjusting the jack screw 61. After adjustment the screws 59 are again tightened to maintain the weldment in its adjusted position.

Secured to the cross plate 54 is an entrance fitting 62 which is externally threaded at 63 so that it can be connected to a tuber which pressurizes and supplies the material for forming the inner tube portion 11 of the finished tube. Preferably the entrance portion 64 of the fitting 62 is shaped (as best illustrated in FIG. 3) substantially as an offset cone to channel the material flowing through the fitting in an offset manner to a cylindrical exit passage 66. Such offset shape laterally displaces the entrance end of the conduit which is connected to the tuber and provides a relatively straight path along which the reinforcing fabric 13 feeds into the nozzle as illustrated in the dotted line. The rearward end of the central tube 43 is welded or otherwise suitably connected at 67 to the entrance fitting 62 in alignment with the exit passage 66 so that material supplied from the tuber connected to the fitting 62 is channeled for flow in along the interior of the tube 43.

The forward end of the tube 43 is internally threaded at 68 to receive a central pin 69. The rearward end of the pin is provided with a plurality of radially extending fin like projections 71 which are peripherally threaded so that the pin can be threaded into the tube and its position along the length of the tube can be adjusted by appropriate rotation to thread the pin either in or out as desired. Material flowing in along the passage 73 within the tube 43 passes between the fins 71 and continues to flow over the central pin 69 to an inner annular orifice or nozzle 74 provided by the central pin 69 and the exit end of the tube 43. Preferably the pin 69 is formed with a tapered portion 76 of gradually increasing diameter which cooperates with the passage 73 to restrict the flow of material along the passage as it approaches the nozzle 74 so that the material flowing past the fins reforms as a homogeneous annular column before reaching the nozzle 74.

The outer nozzle assembly 27 is formed of two nozzle plates 81 and 82 each of which are provided with conical wall portions 83 and 84 respectively which are spaced from each other when the two nozzle parts are bolted together by fasteners 86 to provide a conical flow path 88 terminating at an outer orifice or nozzle at 87. Extending along the outer periphery of the conical flow passage 88 is an arcuate supply passage 89 open to an inlet pipe 91 connected to a tuber which supplies the material forming the outer tubular portion 12 of the hose.

Generally, two tubers are utilized to supply the extrusion head, however in some instances it may be desired to supply the material for both the inner and outer tube portions from a single tuber of suitable capacity and provided with flow control means for balancing the flow between the two nozzles. The use of two tubers, however, provides good flow control adjustment to properly balance the flows through the two nozzles.

The inlet pipe or tube 91 fits through a clearance opening 92 in the cylindrical portion 23 so that it does not restrict the adjustment movement of the outer nozzle assembly 27. The arcuate flow passage 89 extends along the interface between the two nozzle parts 81 and 82 to oppositely dispose to gates 93 and 94 so that material is supplied to the conical passage 88 at peripherally spaced locations. The gates are positioned and sized so that a material enters the conical passage 88 and is directed in a uniform manner to the outer nozzle 87 as a homogeneous annular mass.

The guides 40 and 38 establish the spiral configuration of the fabric strip 13 which passes through the guide and along an annular passage 96 around the tube 43 and around the inner nozzle 74 so that as material is extruded through the inner nozzle 74, it is located within the spiral overlapping tubular fabric strip which is moving along the annular passage 96 within a bore 97. The amount of overlap is selected to provide sufficient bonding of the overlapped fabric to resist the pressures expected to be encountered. Usually an overlap of at least one quarter of an inch is used in a one inch outside diameter hose.

The central pin 69 is preferably formed with a relatively large knob portion 98 positioned downstream from the inner orifice 74 which engages the inner surface of the annular column of material extruding out through the inner nozzle 74 and causes such material to be radially expanded into intimate contact with the inner wall of the tube of the fabric. Such inclined surface 99 also may be positioned as illustrated beyond the outer nozzle 87 so that it presses the inner tubular portion or layer of extruded material outwardly toward the outer layer extruding through the outer nozzle 87 to insure that sufficient pressure is developed to cause the material from the two layers to be bonded together through the openings in the fabric. Preferably, the pin is formed with a cylindrical land or wall 101 which is located radially within a cylindrical wall 102 which cooperate to constitute a third nozzle like structure through which the two layers must pass. Such annular passage between the two walls 101 and 102 is preferably sized so that it has a cross sectional area which is no greater than the total cross sectional area of the inner and outer tubular portions extruding through the inner and outer nozzles 74 and 87 respectively. This relationship insures that the two layers are pressed tightly together so that a permanent and superior bond is established between the two layers through the fabric.

Of course the flow of the extruding material out along the nozzle carries the fabric into the nozzle zone and the process is essentially continuous. In fact, if desired, lengths of fabric can be joined by stitching them together or heat welding the fabric if the fabric is formed of a material which can be heat welded so that the process can be carried out substantially continuously. When the hose material is rubber or curable material the extruded hose is subsequently cured. The structure of the nozzle is arranged so that it can easily be disassembled after operation to completely clean all of the parts. Removal of the face ring 26 and the supply tube 91 allows removal and disassembly of the outer extrusion nozzle assembly 27. Similarly, the central pin 69 can be threaded out of the end of the tube 43 and the tube 43 can be removed by merely removing the bolt fasteners 59.

Further, the structure is arranged to provide adjustment of substantially all of the parts. The fabric guide 38 can be threaded forward or rearwardly along the tube 43. The center pin can be threaded in or out of the tube for adjustment purposes. The inner nozzle system consisting of the tube 43 and pin can be adjusted axially with respect to the outer nozzle assembly and is radially located by the fabric guide. Since the outer nozzle assembly 27 can be radially adjusted, complete adjustment of the relative positions of the two nozzles is provided.

Still further, the fabric approaching the nozzle is substantially accessible. In the illustrated embodiment of FIGS. 1 through 7 a sheet metal guide 40 is illustrated which is formed as a spiral cone like shape and is supported on the fabric guide immediately adjacent to the grooves 44 as best illustrated in FIG. 5. Such guide 40 assists in forming the spiral of the fabric which enters the unit substantially in a flat condition from the right side as viewed in FIG. 3.

It should be pointed out that in some instances it may be desired to feed the fabric in from below the fitting rather than above the fitting as illustrated in FIG. 3. In such instance it is merely necessary to remount the U-shaped weldment in the opposite orientation and to insure that the overlapping section of the fabric guide 38 is again in alignment with the laterally projecting portion of the entrance fitting 62. Further, with this invention means can be provided between the fabric guide 38 and the inner nozzle to bond, heat weld or otherwise connect the overlapping layers of the fabric so that the fabric is a true tube before the inner and outer layers are provided. In most cases, however, sufficient bonding of the overlapping portions of the fabric is provided by the material of the inner and outer layers.

With the method in accordance with the present invention the fabric strip is fed around an inner nozzle which produces a tubular column of extruding material having an inside diameter substantially less than the final inside diameter of the hose. Similarly, an outer tubular layer is extruded in around the outside of the fabric and the inner layer is increased in diameter to insure that the fabric is extended and tensioned, and to create sufficient pressure between the two layers to cause them to bond through the openings in the fabric. In the illustrated preferred embodiment the inner nozzle is located ahead of the outer nozzle so that the inner tubular layer is formed within the fabric before the outer tubular layer is applied to the outside of the fabric and subsequently both layers are caused to pass through a restricted orifice like structure which insures proper sizing of the tube and intimate bonding contact between the two layers.

Figure 8:
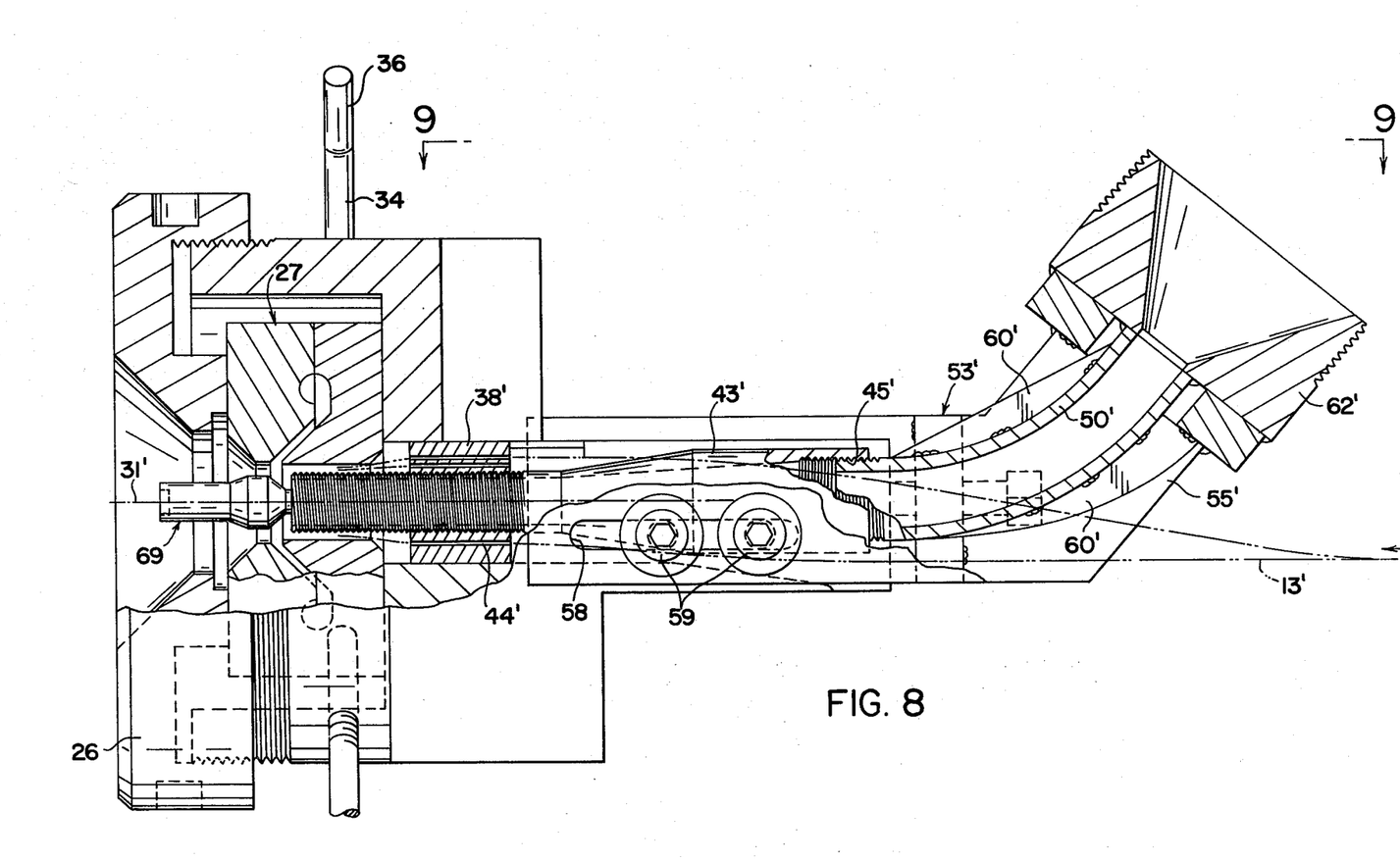
FIG. 8 is a side elevation in longitudinal section of an extrusion head in accordance with another embodiment of this invention.
Figure 9:
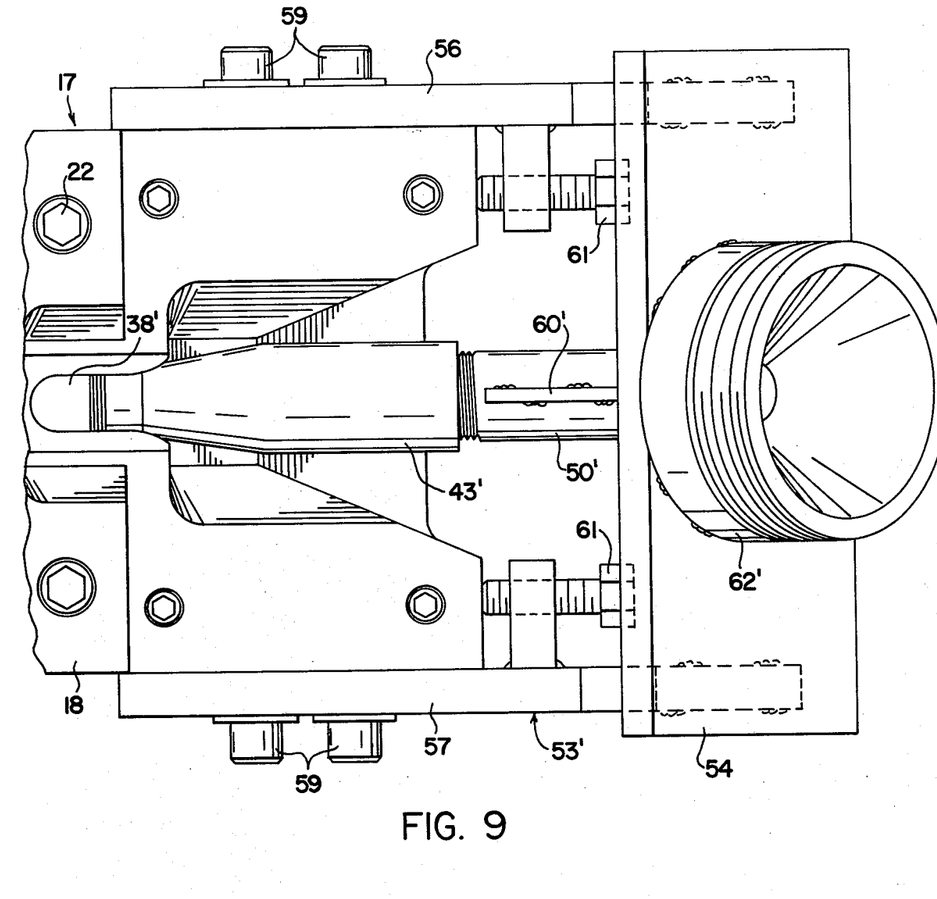
FIG. 9 is a fragmentary plan view of the extrusion head illustrated in FIG. 8.

FIGS. 8 and 9 illustrate a second embodiment of this invention. In this embodiment similar reference numerals are used to designate similar parts with a prime added to indicate that reference is being made to the second embodiment.

Insofar as the extruding function is concerned the embodiment of FIGS. 8 and 9 is essentially identical to the embodiment of FIGS. 2 through 7. In this instance however, the supply tube 43' through which the material forming the inner layer flows is threaded at its outer end at 45' to receive a curved entrance tube 50'. With this structure the entire entrance fitting 62' is laterally displaced from the central axis 31' so that the strip of fabric can commence to wrap around to its spiral shape before reaching the head itself. In fact, the feed of the fabric 13' can be in substantial alignment with one side of the groove 44' so that the spiral form of the fabric can be established easily by the time the fabric reaches the guide 38'. In this structure the U-shaped weldment 53' is also formed with an offset section 55' but is adjustable along the central axis 31 in the same manner as in the prior embodiment.

If it is necessary to provide a stiffening of the curved section 50' fillet plates 60' can be welded or otherwise suitably connected to the curved section of the tubing. With this embodiment, where full access to the fabric is provided until it reaches the fabric guide, the movement of the fabric can be easily monitored to insure proper operation.

In this second embodiment the remaining portions of the extruding head are essentially identical to the corresponding parts of the first embodiment both as to shape and function. Therefore, the detailed description of the first embodiment can be referred to in connection with the second embodiment excepting as noted above.

Although preferred embodiments of this invention are illustrated it is to be understood that various modifications and rearrangements may be resorted to without departing from the scope of the invention disclosed and claimed.

What is claimed is:

1. An extrusion head for producing reinforced hose comprising a frame providing a mounting surface at one end, an outer annular nozzle assembly mounted on said mounting surface, means connected for adjusting the radial position of said outer nozzle assembly along said mounting surface, said frame including an bore open to said mounting surface, an annular guide ring in said bore formed with a spiral groove therethrough, said groove operating to guide an open reinforcing fabric strip as an overlapping spiral tube into said outer nozzle assembly, an elongated inner nozzle assembly extending through said guide ring providing an annular inner nozzle at its exit end within said fabric spiral tube, said inner nozzle assembly being axially adjustable relative to said outer nozzle assembly and having its exit end laterally supported by said guide ring, and frame extension laterally spaced from said inner nozzle assembly laterally supporting the other end of said inner nozzle assembly at a location spaced from said guide ring whereby a clearance zone is provided along which a strip of fabric travels to said guide ring, said inner and outer nozzles operating to extrude inner and outer layers of material respectively against the inner and outer sides of said fabric spiral tube.

2. An extrusion head as set forth in claim 1 wherein said frame is formed with a recess extending to said mounting surface, said outer annular nozzle assembly being located in said recess with radial clearance, and a plurality of peripherally spaced adjusting screws extending into said recess and laterally locating said outer annular nozzle assembly.

3. An extrusion head as set forth in claim 2 wherein said outer annular nozzle assembly consists of a pair of annular plates shaped along their interface with an inwardly extending flow passage along which material for said outer layer flows to an outer annular nozzle around said spiral tube, said plates being secured together and being separable for cleaning of said flow passage.

4. An extrusion head as set forth in claim 3 wherein said outer annular nozzle assembly includes a supply tube which extends generally radially from said frame with clearance to allow a radial adjustment of said outer nozzle assembly.

5. An extrusion head as set forth in claim 4 wherein means are provided downstream from said inner nozzle to radially expand said inner layer into bonding contact with said outer layer through said fabric.

6. An extrusion head as set forth in claim 1 wherein means are provided downstream from said inner nozzle to radially expand said inner layer into bonding contact with said outer layer through said fabric.

7. An extrusion head for reinforced hose comprising a frame, a first conduit means supported on said frame having an entrance end and an exit end and providing an inner annular nozzle at said exit end, fabric guide means on said frame for guiding a strip of fabric and delivering said strip as a spiral tube around said inner nozzle, an annular outer nozzle assembly mounted on said frame, said inner nozzle operating to extrude an inner tubular layer of hose material against the inner surface of said fabric, said outer nozzle assembly operating to extrude an outer layer of hose material against the outer surface of said fabric, said outer nozzle assembly consisting of a pair of annular plates shaped along their interface to provide a conical flow passage with said outer nozzle at the inner end thereof, said pair of plates being connected together and being separable for cleaning or the like, said entrance end of said first conduit means being offset, said frame and said offset of said first conduit means being proportioned to allow said strip of fabric to move into said guide means along a substantially straight path.

8. An extrusion head as set forth in claim 7 wherein said outer nozzle assembly is radially adjustable relative to said inner nozzle, and said inner nozzle is axially adjustable relative to said outer nozzle assembly.

9. An extrusion head for reinforced hose comprising an inner annular nozzle, an outer annular nozzle substantially coaxial with said inner annular nozzle, fabric guide means operable to guide a strip of open fabric and deliver said strip as a spiral tube to a zone between said inner annular nozzle and said outer annular nozzle, said inner annular nozzle operating to extrude an inner tubular layer of hose material within said spiral tube having a diameter less than the required final diameter of said inner layer, said outer annular nozzle operating to extrude an outer layer of hose material around said spiral tube, and expansion means operable to radially expand said inner layer to increase the diameter thereof and press said inner layer outwardly against said fabric tube causing said layers to bond together through said fabric tube.

10. An extrusion head as set forth in claim 9 wherein said expansion means is a central pin supported by said inner nozzle and axially adjustable relative thereto.

11. An extrusion head as set forth in claim 9 wherein said expansion means includes a radially outwardly extending surface operable to engage the inner surface of said inner layer and expand said inner layer as it moves along said extrusion head.

12. An extrusion head as set forth in claim 11 wherein said outer nozzle provides an inwardly facing cylindrical surface surrounding said outer layer operable to resist expansion of said outer layer by said expansion means and to insure in cooperation with said expansion means pressure contact between said layers.

13. An extrusion head as set forth in claim 12 wherein said expansion means includes an outwardly facing cylindrical surface located radially within said inwardly facing cylindrical surface.

14. An extrusion head for reinforced hose comprising a frame, a tube assembly on said frame having an inlet adapted to be connected to a source of hose material and providing an inner nozzle at the exit end thereof through which hose material is extruded to produce an inner tubular layer of reinforcing hose, an annular outer nozzle assembly on said frame around said inner nozzle providing a central bore radially spaced from said exit end of said tube assembly and cooperating therewith to define an annular passage, a fabric guide ring around said tube assembly substantially adjacent to said exit end operable to guide a strip of fabric in an overlapping spiral and to deliver a spiral tube to said annular passage, said outer nozzle assembly providing an outer annular nozzle at the end of said annular passage through which hose material is extruded to produce an outer layer of a reinforced hose, said frame providing support means extending along said tube assembly and spaced therefrom supporting said tube assembly adjacent its inlet end while providing substantial accessible space for guiding a strip of fabric as it moves along said tube assembly to said guide ring.

15. An extrusion head as set forth in claim 14 wherein said tube assembly is curved between its inlet and said guide ring to displace said inlet radially and allow said fabric to move along a substantially straight path to said guide ring.

16. An extrusion head as set forth in claim 15 wherein a radially extending conduit is connected to supply hose material to said outer nozzle assembly.

17. An extrusion head for reinforced hose comprising fabric guide means for delivering a strip of reinforcing fabric in overlapping spiral tube to an extrusion zone, an inner nozzle operable to extrude an inner tubular layer of hose material against the inside of said spiral tube, an outer nozzle operable to extrude an outer tubular layer of hose material against the outside of said spiral tube, and expansion means operable to expand said inner layer and cause said spiral tube to extend fully and cause said layers to be pressed into bonding contact through said fabric.

18. An extrusion head as set forth in claim 17 wherein said expansion means is a centrally located pin providing an enlarged land over which the said inner layer moves after leaving said inner nozzle.

19. An extrusion head as set forth in claim 18 wherein said pin constitutes a part of said inner nozzle.

20. An extrusion head as set forth in claim 18 wherein said pin and outer nozzle assembly provide opposed substantially concentric surfaces between which said layers pass and which cooperate to size said hose and press said layers into bonding contact.

21. An extrusion head for producing reinforced rubber hose or the like comprising a frame having an axis, an outer annular orifice assembly mounted at one end of said frame around said axis and including an outer annular orifice and a radially extending outer supply conduit, an inner annular orifice assembly including an inner supply conduit extending generally along said axis from said entrance end to an inner annular orifice at the exit end thereof, said inner and outer annular orifices being substantially co-axial, a fabric guide encircling said inner conduit ahead of said outer orifice assembly operable to establish a spiral tube of fabric for delivery to the zone between said orifices, and support means extending along said inner conduit spaced therefrom and supporting the entrance end of said inner conduit on said frame at a location substantially spaced ahead of said fabric guide, said frame and inner supply conduit providing a clearance space along which fabric feeds to said fabric guide.

* * * * *